A. SCHICK.
VEHICLE WHEEL.
APPLICATION FILED OCT. 20, 1910.
1,019,192. Patented Mar. 5, 1912.
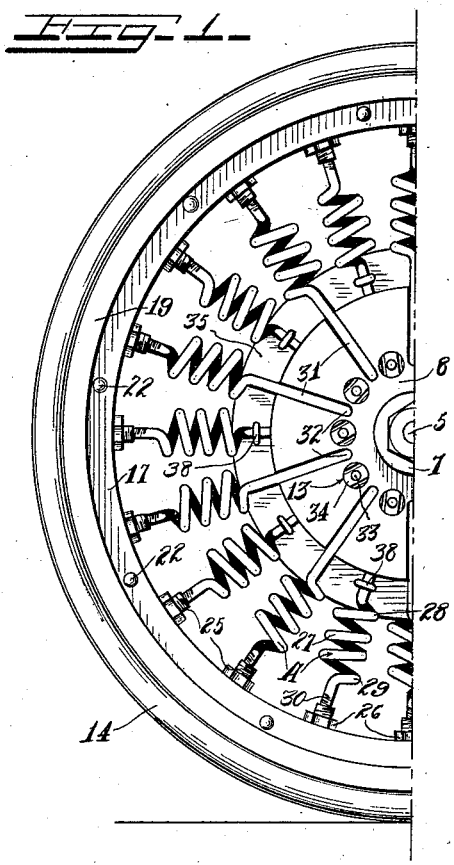
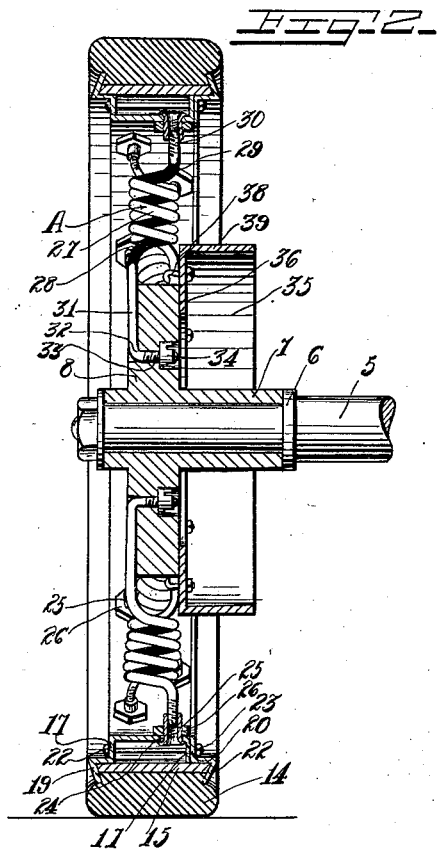
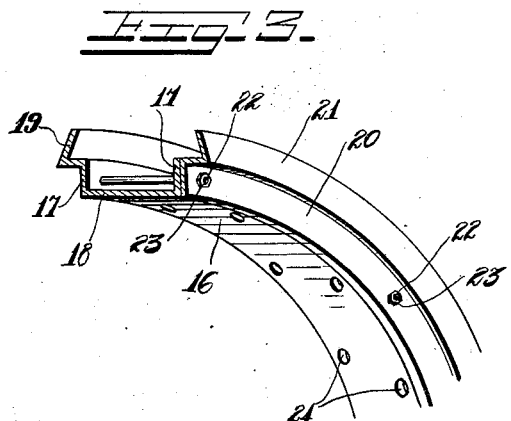
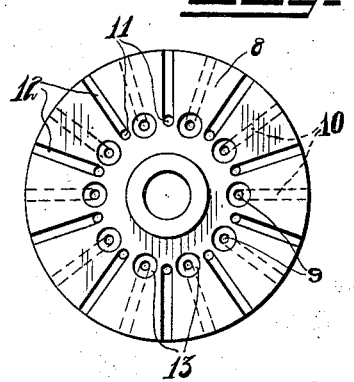
Inventor
Adolph Schick.
Witnesses
By
Attorneys

UNITED STATES PATENT OFFICE.

ADOLPH SCHICK, OF WHEELING, WEST VIRGINIA.

VEHICLE-WHEEL.

1,019,192. Specification of Letters Patent. Patented Mar. 5, 1912.

Application filed October 20, 1910. Serial No. 588,102.

*To all whom it may concern:*

Be it known that I, ADOLPH SCHICK, a citizen of the United States, residing at Wheeling, in the county of Ohio, State of West Virginia, have invented certain new and useful Improvements in Vehicle-Wheels; and I do hereby declare the following to be a full, clear, and exact description of the invention, such as will enable others skilled in the art to which it appertains to make and use the same.

This invention relates to an improvement in spring wheels, and has for its principal object to provide a structure of the class described in which spring spokes are employed for creating a resiliency to the wheel for eliminating unnecessary jars to the vehicle to which the wheel is applied.

Another object of the invention is to provide a wheel for the purpose described which includes a novel construction of hub whereby any side thrust thereof will coact with the spokes to limit the said side thrust.

A further object of the invention is to provide a structure in which a novel construction of rim is employed.

A still further object of the invention is to provide a rim having tensioning means for the spokes whereby the tension of the springs can be easily and quickly changed, and when changed may be securely locked against accidental movement.

A still further object of the invention is to construct a wheel of the character described, which is composed of a minimum number of parts, is therefore simple in construction and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages.

In the drawing: Figure 1 is a fragmentary plan view of the wheel constructed in accordance with my invention. Fig. 2 is a central transverse sectional view through the same, Fig. 3 is a detail view of the inner face of the rim showing the spoke sockets disposed in staggered relation, and Fig. 4 is a face view of the hub.

Like reference numerals designate corresponding parts in all the figures of the drawing.

Referring to the drawing, 5 designates an axle having a collar 6, which is spaced from the outer end of said axle. Freely mounted on the said outer end of the axle is a hub 7, which is provided with a centrally extending peripheral flange 8. A plurality of spaced transverse openings 9 are formed in the flange in spaced relation to the hub. Formed in one face of the flange is a plurality of grooves 10, which respectively project radially from the openings 9 to the periphery of the said flange. Also formed in the flange 8 are other transverse openings 11, these openings being disposed intermediate the openings 9. Formed in the other face of the flange is a plurality of radially extending grooves 12, which extend from the openings 11 to the periphery of said flange. It will thus be observed that the grooves 10 and 12 are disposed on opposite faces of the flange and in staggered relation. Formed in each face of the flange, and respectively communicating with the ends of the transverse openings opposite the respective communicating radial grooves, are seats 13.

The invention further comprises a tire 14, which may be of rubber or any other suitable material. Disposed directly against the inner face of the tire is a circumferential plate 15, and bearing against the said plate is a U-shaped rim 16. This rim includes spaced walls 17—17 and a connecting portion 18, the said walls resting against the plate 15, and the connecting portion 18 is disposed in spaced relation to said plate. Integral with and extending from the outer edge of one of the walls 17 is a tire flange 19. A clamping plate 20 is associated with the other wall 17, and is provided at its outer edge with an integral tire flange 21. Bolts 22 pass through the said clamping plate 20 and the walls 17 of the rim 16. A nut 23 or other suitable fastening means is associated with each bolt for securing the tire 14, rim 16, and clamp plate 20 together. Formed in the connecting wall 18 of the rim 16, is a plurality of outwardly flared openings 24, and these openings are disposed in spaced and in staggered relation. A hollow and interiorly threaded thimble 25 has its outer end enlarged and disposed within the opening 24, it being understood that one of these thimbles is associated with each of the openings. It will be observed in this connection that these thimbles can be freely rotated within the opening, but are prevented from becoming withdrawn therefrom. Each thimble is also threaded on its exterior surface, and associated therewith is a lock nut 26.

The invention further comprises a plurality of spokes A formed of spring steel wire or the like. Each of these springs is coiled intermediate its ends, as indicated by 27, and the opposite ends of each spoke project from the coil at diametrically opposite points as indicated by 28 and 29 respectively in planes parallel with the axis of the coil. One end 30 of each spoke is threaded for engagement with the thimble 25, and the other end portion 31 is adapted to be disposed in the proper radial groove 10 or 12 as the case may be, of the hub, and has its extreme end portion 32 bent at right angles and disposed within the communicating transverse opening 9 or 11. The extreme end 33 of the spoke is threaded and extends into the seat 13, and is secured against movement by a nut 34 which is arranged in the seat 13.

The invention further comprises a brake-drum 35 having an integral flange 36 extending inwardly from one edge thereof, said flange being provided with a plurality of openings. This brake-drum is disposed against the inner face of the hub and is secured to the inner spokes by means of hook-bolts 38 and nuts 39, said hook-bolts passing through the openings of the brake-drum.

From the foregoing, it will be observed that the inner end portions of the spokes are disposed in staggered relation on opposite sides of the hub flange, and that the outer end portions of the spokes are oppositely disposed to the inner portions. By this construction it will be observed that any tendency of side thrust to the hub is resisted by the said spokes, and this side thrust is further resisted by the brake-drum which is carried by the inner spokes. It will be noted that the tension of the spoke springs can be quickly and easily regulated by releasing the lock-nut 26 and rotating the thimble 25 in the proper direction, after which the lock-nut can be returned to its normal position and thereby prevent the thimble from reverse rotation.

What is claimed is:

1. A spring wheel comprising in combination, a rim, a hub having a peripheral flange, and spring steel spokes coiled intermediate the ends and having the outer ends connected to the rim and the inner ends alternately disposed on either side of and connected to the hub flange, said end portions extending from diametrically opposite points of the coils, and disposed in planes parallel with the axis of the coil.

2. A spring wheel comprising in combination, a rim, a hub having a peripheral flange, said flange being provided with a series of transverse openings and a plurality of grooves extending radially from the openings to the periphery of the flange, said grooves being alternately disposed on opposite faces of the flange, spokes having their outer ends connected to the rim and their inner end portions seated within the grooves and the openings, and fastening means for the inner ends of the spokes.

3. A spoke formed of spring steel wire and coiled intermediate its ends, the end portions of the spoke extending from diametrically opposite points of the coil, and disposed in planes parallel to the axis of the coil.

In testimony whereof I affix my signature in presence of two witnesses.

ADOLPH SCHICK.

Witnesses:
W. P. ROBINSON,
ALAN H. ROBINSON.

Copies of this patent may be obtained for five cents each, by addressing the "Commissioner of Patents, Washington, D. C."